United States Patent
Shimizu et al.

(10) Patent No.: US 12,263,723 B2
(45) Date of Patent: Apr. 1, 2025

(54) GLASS RUN

(71) Applicant: TOYODA GOSEI CO., LTD., Kiyosu (JP)

(72) Inventors: Yasuhiro Shimizu, Kiyosu (JP); Masatoshi Nojiri, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 18/524,292

(22) Filed: Nov. 30, 2023

(65) Prior Publication Data

US 2024/0208310 A1 Jun. 27, 2024

(30) Foreign Application Priority Data

Dec. 23, 2022 (JP) .................. 2022-206403
Sep. 7, 2023 (JP) .................. 2023-145097

(51) Int. Cl.
  *B60J 10/76* (2016.01)
  *B60J 10/16* (2016.01)

(52) U.S. Cl.
  CPC ............. *B60J 10/76* (2016.02); *B60J 10/16* (2016.02)

(58) Field of Classification Search
  CPC ... B60J 10/76; B60J 10/74; B60J 10/15; B60J 10/16; B60J 10/17; B60J 5/0402
  USPC ....................................................... 49/490.1
  See application file for complete search history.

(56) References Cited

U.S. PATENT DOCUMENTS

| | | | | |
|---|---|---|---|---|
| 6,389,754 B2* | 5/2002 | Nozaki | ..................... | B60J 10/74 49/498.1 |
| 7,763,197 B2* | 7/2010 | Ellis | ...................... | B60J 10/16 264/173.17 |
| 9,327,584 B2* | 5/2016 | Dosaki | ...................... | B60J 10/76 |
| 9,475,374 B2* | 10/2016 | Murree | ............. | B29D 99/0053 |
| 9,649,921 B2* | 5/2017 | Bessho | ................ | E05D 15/165 |
| 10,131,216 B2* | 11/2018 | Murree | ..................... | B60J 10/27 |
| 10,406,902 B2* | 9/2019 | Masumoto | .............. | B60J 10/50 |
| 10,661,644 B1* | 5/2020 | Larsen | ...................... | B60J 10/26 |
| 10,766,433 B2* | 9/2020 | Tomoyasu | .............. | B60J 10/16 |
| 2005/0003158 A1* | 1/2005 | Yamasa | .................... | B60J 10/17 264/177.1 |
| 2011/0109009 A1* | 5/2011 | Guellec | .................... | B60J 10/78 264/254 |
| 2011/0239410 A1* | 10/2011 | Goto | ....................... | B60J 10/74 16/96 R |
| 2015/0082709 A1* | 3/2015 | Dosaki | .................... | B60J 10/76 49/490.1 |
| 2019/0039444 A1* | 2/2019 | Brookman | ............ | B60J 10/277 |
| 2019/0299764 A1* | 10/2019 | Moriya | .................... | B60J 10/17 |

(Continued)

FOREIGN PATENT DOCUMENTS

JP 2021-024388 A 2/2021

*Primary Examiner* — Justin B Rephann
(74) *Attorney, Agent, or Firm* — Posz Law Group, PLC

(57) ABSTRACT

The glass run includes: a bottom wall; a vehicle inner side wall extending from the bottom wall; a vehicle outer side wall extending from the bottom wall; a vehicle inner seal lip connected to the vehicle inner side wall; and a vehicle outer seal lip connected to the vehicle outer side wall, and is configured to guide an up and down movement of a door glass. In the glass run, a hard portion is formed on the vehicle outer side wall, the hard portion having a higher hardness than a material that forms the vehicle outer side wall. The hard portion abuts the vehicle outer seal lip.

7 Claims, 5 Drawing Sheets

(56) References Cited

U.S. PATENT DOCUMENTS

| | | | |
|---|---|---|---|
| 2019/0329639 A1* | 10/2019 | Sugawa | B60J 10/74 |
| 2020/0101828 A1* | 4/2020 | Oshima | B60J 10/16 |
| 2020/0130488 A1* | 4/2020 | Choi | B60J 1/17 |
| 2020/0156451 A1* | 5/2020 | Miyata | B60J 10/27 |
| 2020/0307364 A1* | 10/2020 | Nojiri | B60J 5/0402 |
| 2020/0317037 A1* | 10/2020 | Yang | B29C 48/16 |
| 2022/0388382 A1* | 12/2022 | Williams | B60J 10/76 |

* cited by examiner

COMPARATIVE EXAMPLE

GLASS RUN

CROSS REFERENCE TO RELATED APPLICATION

This application claims the priority benefit of Japanese Patent Application No. 2022-206403 filed on Dec. 23, 2022 and No. 2023-145097 filed on Sep. 7, 2023. The entirely of the above-mentioned patent application is hereby incorporated by reference herein and made a part of this application.

BACKGROUND OF THE INVENTION

(1) Field of the Invention

The present invention relates to a glass run attached to a door frame formed on a door of a vehicle such as an automobile.

(2) Description of Related Art

Improving quietness of a vehicle such as an automobile increases comfort of a passenger and thus, a degree of appeal for improving product competitiveness is higher. In an electric automobile expected to spread rapidly in the future, a conventionally installed engine is removed. When an engine sound has been removed, remaining noise is mainly road noise and wind noise. Thus, countermeasures to reduce these noises have been increasing required.

The wind noise is a sound generated by wind hitting a vehicle when the vehicle is traveling; and the sound generated outside a passenger compartment transmits through a vehicle body to reach the passenger compartment. It is known that a door glass near the passenger's ears in the passenger compartment contributes most to the wind noise in the sound transmitting path. Countermeasures, such as increasing a thickness of the door glass and setting an acoustic glass have been implemented, which however causes an increase in weight and cost.

In addition to the door glass, a glass run as a sealing material between the door glass and a door frame may reduce noise in particularly a high frequency range of 1 kHz or higher. A study is being conducted to increase a reduction effect of this type.

As a technique to reduce noise by utilizing the glass run, for example, Japanese Patent Application Laid-Open No. 2021-24388 is known. As illustrated in FIG. 9, a glass run 100 has a basic framework of a bottom wall 200, a vehicle outer side wall 300, and a vehicle inner side wall 400, and is formed in a channel shape (having a substantially U-shaped cross section). At a tip of the vehicle outer side wall 300, a cover lip 340 is formed abutting a door glass 600. A vehicle outer seal lip 310 is formed at the vehicle inner side of the cover lip 340 of the vehicle outer side wall 300 and closer to the bottom wall 200, protruding toward the bottom wall 200 and sliding with the door glass 600.

Meanwhile, at a tip of the vehicle inner side wall 400, a first vehicle inner seal lip 450 and a second vehicle inner seal lip 460 are formed toward the bottom wall 200 to slide with the door glass 600. The second vehicle inner seal lip 460 is formed closer to the bottom wall 200 than the first vehicle inner seal lip 450. The first vehicle inner seal lip 450 and the second vehicle inner seal lip 460 do not abut each other when sliding with the door glass 600. Accordingly, with a plurality of the vehicle inner seal lips, the transmitting sound coming through the sound transmitting path in the glass run shown on arrow A is increasingly shielded.

SUMMARY OF THE INVENTION

As a technique to reduce noise caused by wind noise, it is possible to reduce vibration by utilizing so-called impedance matching, in which a vibration energy of a door glass efficiently flows to components abutting the door glass and dissipates. However, studies are not being sufficiently conducted on this countermeasure.

The present invention provides a glass run configured to reduce the noise caused by wind noise, with focus on the impedance matching, in which the vibration energy of the door glass efficiently flows and dissipates.

In order to achieve the object above, provided is a glass run according to a first disclosed aspect, the glass run attached to an inner peripheral edge of a door frame of a door of a vehicle. The glass run includes: a bottom wall; a vehicle inner side wall extending from the bottom wall; a vehicle outer side wall extending from the bottom wall; a vehicle inner seal lip connected to the vehicle inner side wall; and a vehicle outer seal lip connected to the vehicle outer side wall, and is configured to guide an up and down movement of a door glass. In the glass run, a hard portion is formed on the vehicle outer side wall, the hard portion having a higher hardness than a material that forms the vehicle outer side wall, and the hard portion abuts the vehicle outer seal lip.

With the glass run according to the first disclosed aspect, the hard portion is formed on the vehicle outer side wall, and has the higher hardness than the material that forms the vehicle outer side wall. The hard portion abuts the vehicle outer seal lip. With this configuration, the glass run including the vehicle outer side wall has an increased rigidity, allowing the vibration energy of the door glass to efficiently flow and dissipate. As a result, the noise caused by wind noise is reduced.

In order to cause the hard portion to abut the vehicle outer seal lip and increase the rigidity of the glass run including the vehicle outer side wall to allow the vibration energy of the door glass to efficiently flow and dissipate, the hard portion preferably abuts the vehicle outer seal lip in an increased area. In other words, a surface of the hard portion preferably abuts a surface of the vehicle outer seal lip, and further preferably a vehicle inner surface of the hard portion fully abuts a vehicle inner surface of the vehicle outer seal lip.

Here, the "rigidity of the glass run" is expressed by an amount of increase in a reaction force from the glass run with respect to an amount of displacement of an area where the door glass presses the glass run. Accordingly, when "the rigidity of the glass run increases", a slope (gradient) increases in a relationship between the displacement and the reaction force.

In impedance matching between the door glass and the glass run, presumably, impedance of the door glass is dominated by mass of the door glass, and impedance of the glass run is dominated by the rigidity of the glass run. In a high frequency range of 1 kHz or higher, in which the glass run is expected to reduce the noise, the impedance of the door glass is greater than the impedance of the glass run. Accordingly, with the increased rigidity of the glass run, the impedance of the glass run may be closer or equivalent to the impedance of the door glass; and this impedance matching may allow the vibration energy of the door glass to efficiently flow to the glass run to dissipate. As a result, the noise caused by wind noise may be reduced.

In a second disclosed aspect, with the glass run according to the first disclosed aspect, the hard portion is formed through the vehicle outer side wall from a vehicle inner side toward a vehicle outer side, and the hard portion abuts the door frame.

In the second disclosed aspect, the hard portion is formed through the vehicle outer side wall from the vehicle inner side toward the vehicle outer side, and the hard portion abuts the door frame. With this configuration, the hard portion abuts the vehicle outer seal lip to be sandwiched between the door frame and door glass, leading to the increased rigidity of the glass run including the vehicle outer side wall. As a result, the vibration energy transmitted from the vehicle outer seal lip to the vehicle outer side wall (where the hard portion is formed) is efficiently reduced, and the noise caused by wind noise is further reduced.

In a third disclosed aspect, with the glass run according to the first disclosed aspect, the hard portion is formed inward from a vehicle inner surface of the vehicle outer side wall.

In a fourth disclosed aspect, with the glass run according to the first disclosed aspect, the hard portion is formed protruding toward the vehicle inner side from the vehicle inner surface of vehicle outer side wall.

In the third disclosed aspect and the fourth disclosed aspect, an area where the hard portion is formed in the vehicle outer side wall is specified; and the third disclosed aspect is usable when the glass run is attached to the door frame, particularly in a case that the vehicle outer side wall and the vehicle outer seal lip have a limited space therebetween. The hard portion is formed inward from the vehicle inner surface of the vehicle outer side wall, and abuts the vehicle outer seal lip. With this configuration, the glass run including the vehicle outer side wall has the increased rigidity, allowing the vibration energy of the door glass to efficiently flow and dissipate. As a result, the noise caused by wind noise is reduced.

The fourth disclosed aspect is usable when the glass run is attached to the door frame, particularly in a case that the vehicle outer side wall and the vehicle outer seal lip have a greater space therebetween. Here, the hard portion is formed protruding toward the vehicle inner side from the vehicle inner surface of the vehicle outer side wall, and abuts the vehicle outer seal lip. With this configuration, the glass run including the vehicle outer side wall has the increased rigidity, allowing the vibration energy of the door glass to efficiently flow and dissipate. As a result, the noise caused by wind noise is reduced.

In a fifth disclosed aspect with the glass run according to the third disclosed aspect, and in a sixth disclosed aspect with the glass run according to the fourth disclosed aspect, the vehicle outer side wall includes a hard-portion-forming portion where the hard portion is formed, and the hard-portion-forming portion abuts the door frame.

In the fifth disclosed aspect, and the sixth disclosed aspect, the hard-portion-forming portion, in which the hard portion is formed, in the vehicle outer side wall abuts the door frame. Here, the hard-portion-forming portion abuts the vehicle outer seal lip to be sandwiched between the door frame and door glass, leading to the increased rigidity of the glass run including the vehicle outer side wall. As a result, the vibration energy transmitted to the hard-portion-forming portion, in which the hard portion is formed, in the vehicle outer side wall is efficiently reduced, and the noise caused by wind noise is further reduced.

Here, the "hard-portion-forming portion" corresponds to an area where the hard portion is located in the vehicle outer side wall from the vehicle inner side toward the vehicle outer side.

In a seventh disclosed aspect with the glass run according to the fifth disclosed aspect, and in eighth disclosed aspect with the glass run according to the sixth disclosed aspect, a vehicle outer hard portion is formed on a vehicle outer surface of the vehicle outer side wall, and the vehicle outer hard portion abuts the door frame.

In the seventh disclosed aspect, and in the eighth disclosed aspect, the vehicle outer hard portion is formed on the vehicle outer surface of the vehicle outer side wall, and abuts the door frame. With this configuration, the glass run including the vehicle outer side wall has further increased rigidity. Then, the vibration energy transmitted to the hard-portion-forming portion, in which the hard portion is formed, in the vehicle outer side wall is efficiently reduced, and the noise caused by wind noise is further reduced.

In a ninth disclosed aspect, with the glass run according to the first disclosed aspects, the hard portion is formed including a neutral axis of the vehicle outer side wall.

For example, in many cases, the door frame has a curved shape at an upper part of the vehicle, projecting toward an outer peripheral edge of a window, and the glass run needs to be deformed to align with the shape of the door frame. In this case, the vehicle outer side wall is to expand at closer to the bottom wall, and is to contract at closer to the vehicle outer seal lip. However, the hard portion hardly expands or contracts, and may thus hinder the glass run from being deformed to align with the shape of the door frame.

In the ninth disclosed aspect, the hard portion is formed including the neutral axis of the vehicle outer side wall. With this configuration, when the glass run is deformed to align with the shape of the door frame, the hard portion is less prone to hinder the glass run from being deformed, and rather facilitates the glass run to be deformed to align with the curved shape of the door frame.

Here, the "neutral axis" corresponds to a surface that does not expand or contract when a bending moment is applied to an object, and is a technical term in material mechanics.

Provided is a glass run attached to an inner peripheral edge of a door frame of a door of a vehicle. The glass run includes: a bottom wall; a vehicle inner side wall extending from the bottom wall; a vehicle outer side wall extending from the bottom wall; a vehicle inner seal lip connected to the vehicle inner side wall; and a vehicle outer seal lip connected to the vehicle outer side wall, and is configured to guide an up and down movement of a door glass. In the glass run, a hard portion is formed on the vehicle outer side wall, the hard portion having a higher hardness than a material that forms the vehicle outer side wall, and the hard portion abuts the vehicle outer seal lip. With this configuration, the glass run including the vehicle outer side wall has an increased rigidity, allowing a vibration energy of the door glass to efficiently flow and dissipate. As a result, the noise caused by wind noise is reduced.

DETAILED DESCRIPTION OF PREFERRED EMBODIMENTS

Figure 1:
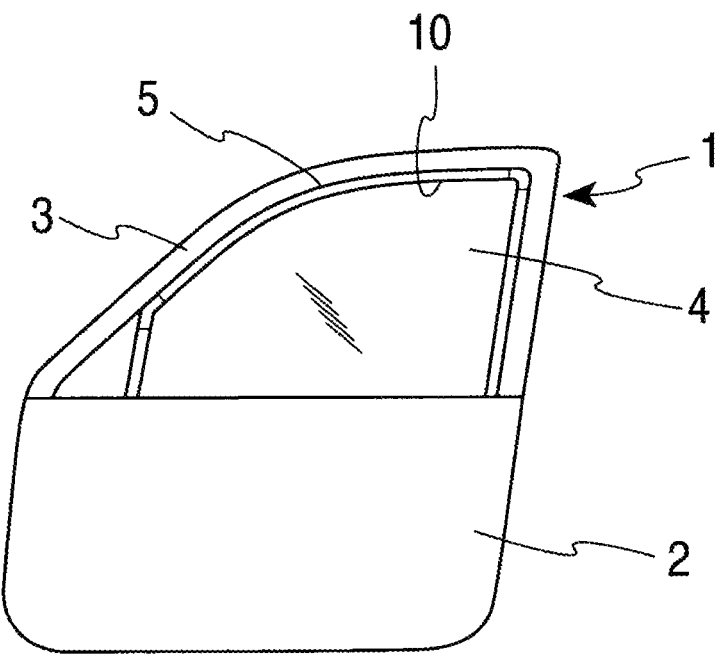
FIG. 1 is a front view of a door for an automobile.
Figure 2:
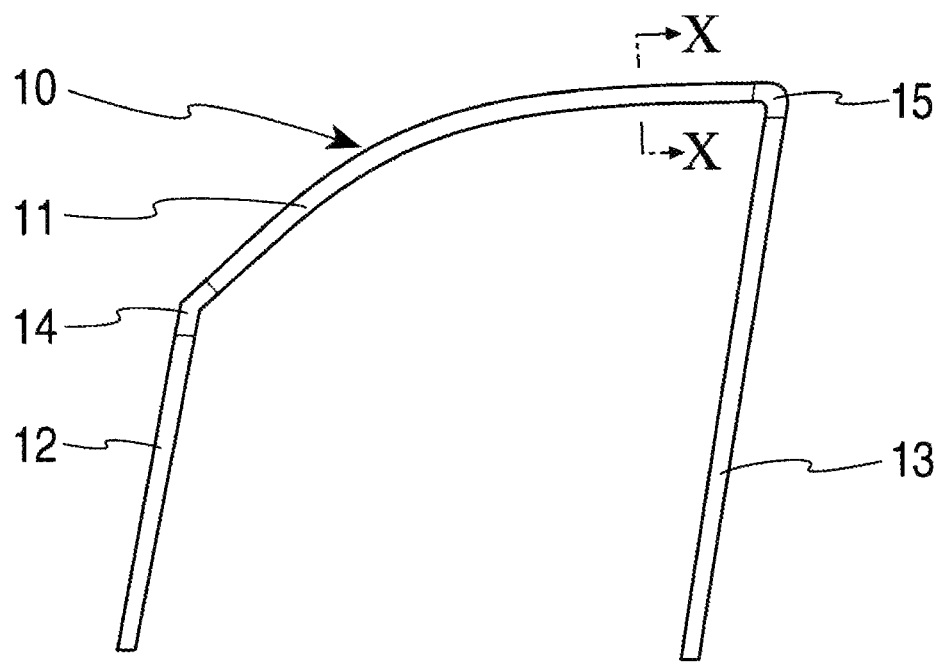
FIG. 2 is a front view illustrating a glass run used for a door frame in FIG. 1.

A first embodiment of the present invention will be described with reference to FIGS. 1 to 3 and FIG. 5. FIGS. 1 and 2 are also applied to second, third, and fourth embodiments of the present invention as will be described later. FIG. 1 is a front view of a front door 1 on a left side of an automobile as seen from a vehicle outer side. The front door 1 includes a door body 2, and a door frame 3 is attached to an upper edge of the door body 2. The door frame 3 and the upper edge of the door body 2 form a window opening. A glass run 10 is attached to the door frame 3 and the inside of the door body 2 to guide an up and down movement of a door glass 4. The present invention is applicable not only to the front door 1 on the left side but also to a front door on a right side, rear doors on left and right sides. Further, the present invention is applicable to a sliding door at which the door glass moves up and down.

FIG. 2 is a simplified front view of the glass run 10 alone, as seen from the vehicle outer side. The glass run 10 includes a first extruded portion 11 corresponding to a lateral frame of the door frame 3, a second extruded portion 12 corresponding to a vertical frame of the door frame 3 at a front side of the front door 1, and a third extruded portion 13 corresponding to a vertical frame of the door frame 3 at a rear side of the front door 1. A front end of the first extruded portion 11 is connected to an upper end of the second extruded portion 12 by a first molded portion 14. A rear end of the first extruded portion 11 is connected to an upper end of the third extruded portion 13 by a second molded portion 15.

Figure 3:
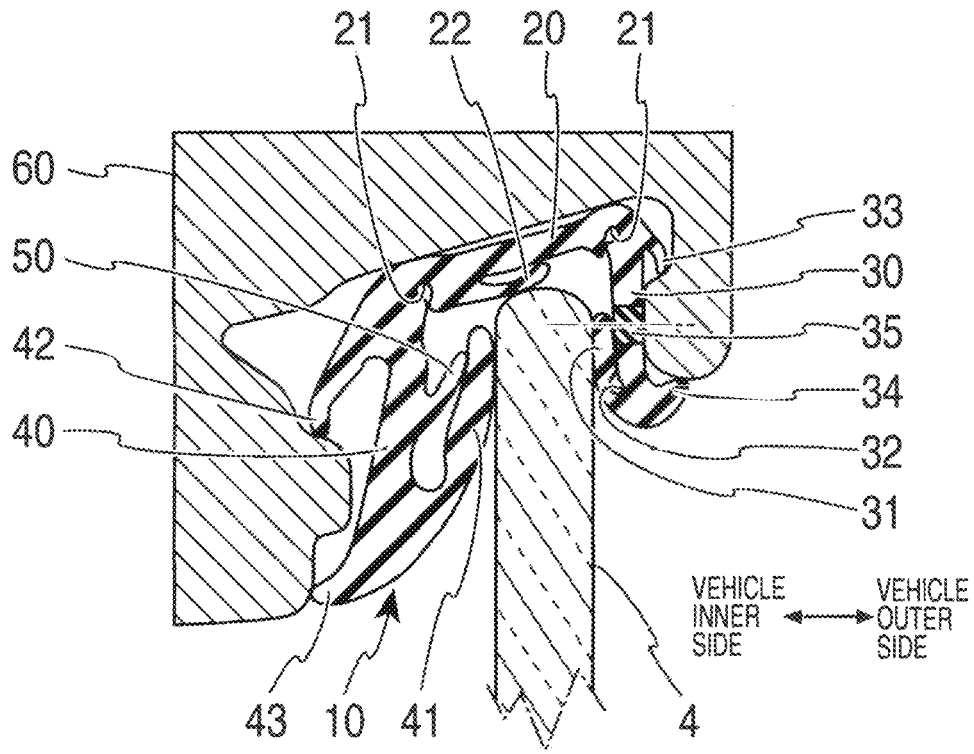
FIG. 3 is a sectional view of a glass run according to a first embodiment of the present invention, taken along line X-X in FIG. 2.

FIG. 3 is a sectional view of the glass run 10, taken along line X-X in FIG. 2, and the door glass 4 is fully closed at the first extruded portion 11 corresponding to the lateral frame of the door frame 3. Here, the glass run 10 is attached to a jig 60 to measure a noise reduction effect, as will be described later. The jig 60 has an inner surface shaped to trace a shape of the door frame 3, to which the glass run 10 is to be attached when being attached to the vehicle. As illustrated in FIG. 3, the glass run 10 has a basic framework of a bottom wall 20, a vehicle outer side wall 30, and a vehicle inner side wall 40, and is formed in a channel shape (having a substantially U-shaped cross section). The bottom wall 20, the vehicle outer side wall 30, and the vehicle inner side wall 40 are connected to expand in a free state by a groove 21 at the vehicle outer side and a groove 21 at a vehicle inner side.

The bottom wall 20 is formed in a substantially plate shape. On a surface of the bottom wall 20 near the door glass 4, a door glass lip 22 protrudes toward the door glass 4. The door glass lip 22 has a curved shape, projecting towards the door glass 4. The door glass lip 22 near the door glass 4 abuts the door glass 4. Further, a tip of the door glass lip 22 abuts the bottom wall 20. Note that the door glass lip 22 may not be formed.

At the vehicle inner side of the vehicle outer side wall 30, a vehicle outer seal lip 31 protrudes from the tip of the vehicle outer side wall 30 toward the vehicle inner side and toward the bottom wall 20 to slide with the door glass 4. In an area in which the vehicle outer side wall 30 and the vehicle outer seal lip 31 are connected near the bottom wall 20, a vehicle outer seal lip recess 32 is formed to facilitate the vehicle outer seal lip 31 to be deflected. At a vehicle outer side of the vehicle outer side wall 30, a first holding lip 33 and a second holding lip 34 are formed to sandwich the inner surface of the jig 60 (the door frame 3 when being attached to the vehicle) having a bent shape.

On the vehicle outer side wall 30, a hard portion 35 is formed. The hard portion 35 is higher in hardness than a material that forms the vehicle outer side wall 30. In the present embodiment, the hard portion 35 is formed through the vehicle outer side wall 30 from the vehicle inner side (closer to the door glass 4) toward the vehicle outer side (closer to the jig 60 (closer to the door frame 3 when being attached to the vehicle)). Here, a neutral axis in the vehicle outer side wall 30 is illustrated with a broken line.

The hard portion 35 is formed including the neutral axis of the vehicle outer side wall 30. With this configuration, when the glass run 10 is deformed to align with the shape of the door frame 3, the hard portion 35 is less prone to hinder the glass run 10 from being deformed, and rather facilitates the glass run 10 to be deformed to align with the curved shape of the door frame 3.

The hard portion 35 is formed to abut the vehicle outer seal lip 31. The hard portion 35 abuts the vehicle outer seal lip 31, leading to an increased rigidity of the glass run 10 including the vehicle outer side wall 30. Thus, when the glass run 10 comes to abut the door glass 4, a vibration energy of the door glass 4 is to efficiently flow and dissipate. As a result, the noise caused by wind noise is reduced.

The hard portion 35 also abuts the jig 60 (the door frame 3 when being attached to the vehicle). With this configuration, the hard portion 35 abuts the vehicle outer seal lip 31 to be sandwiched between the jig 60 (the door frame 3 when being attached to the vehicle) and the door glass 4, leading to further increased rigidity of the glass run 10 including the vehicle outer side wall 30. As a result, the vibration energy transmitted to the hard portion 35 is efficiently reduced, and the noise caused by wind noise is further reduced.

In the present embodiment, as illustrated in FIG. 3, a vehicle outer surface of the vehicle outer seal lip 31 abuts a vehicle inner surface of the vehicle outer side wall 30 except for the vehicle outer seal lip recess 32, and a tip of vehicle outer seal lip 31 abuts the hard portion 35. As a result, the rigidity the glass run 10 including the vehicle outer side wall 30 further increases, and when the glass run 10 comes to abut the door glass 4, the vibration energy of the door glass 4 is to efficiently flow and dissipate. Thus, the noise caused by wind noise is to be further reduced.

At a vehicle outer side of the vehicle inner side wall 40, a vehicle inner seal lip 41 protrudes from a tip of the vehicle inner side wall 40 toward the vehicle outer side and toward the bottom wall 20 to slide with the door glass 4. In addition, on a vehicle outer surface of the vehicle inner side wall 40 and closer to the bottom wall 20 than the vehicle inner seal lip 41, a sub lip 50 protrudes toward the vehicle outer side and toward the bottom wall 20. The sub lip 50 abuts a vehicle inner surface of the vehicle inner seal lip 41 to increase pressing force from the vehicle inner seal lip 41 to a vehicle inner surface of the door glass 4. Note that, the sub lip 50 may protrude in an opposite direction to the bottom wall 20. Further, the sub lip 50 may not be formed.

At the vehicle inner side of the vehicle inner side wall 40, a first holding lip 42 and an abutting rib 43 are formed to hold the inner surface of the jig 60 (the door frame 3 when being attached to the vehicle) having the bent shape.

In the present embodiment, the hard portion 35 is produced by extrusion molding using polypropylene (PP), and the glass run 10 excluding the hard portion 35 is produced by extrusion molding using olefinic thermoplastic elastomer (TPO) with an international rubber hardness (IRHD) of 80±5. The hard portion 35 may use the same TPO as the other portions and in this case, preferably with the IRHD of 100±5. Further, instead of the PP, a hard resin material, for example, an olefin-based resin such as polystyrene may be used.

When the door glass 4 is fully closed, as illustrated in FIG. 3, the vehicle outer seal lip 31 is in elastic contact with a vehicle outer surface of the door glass 4; the vehicle inner seal lip 41 is in elastic contact with the vehicle inner surface of the door glass 4; and the door glass lip 22 is in elastic contact with a tip of the door glass 4.

Figure 4:
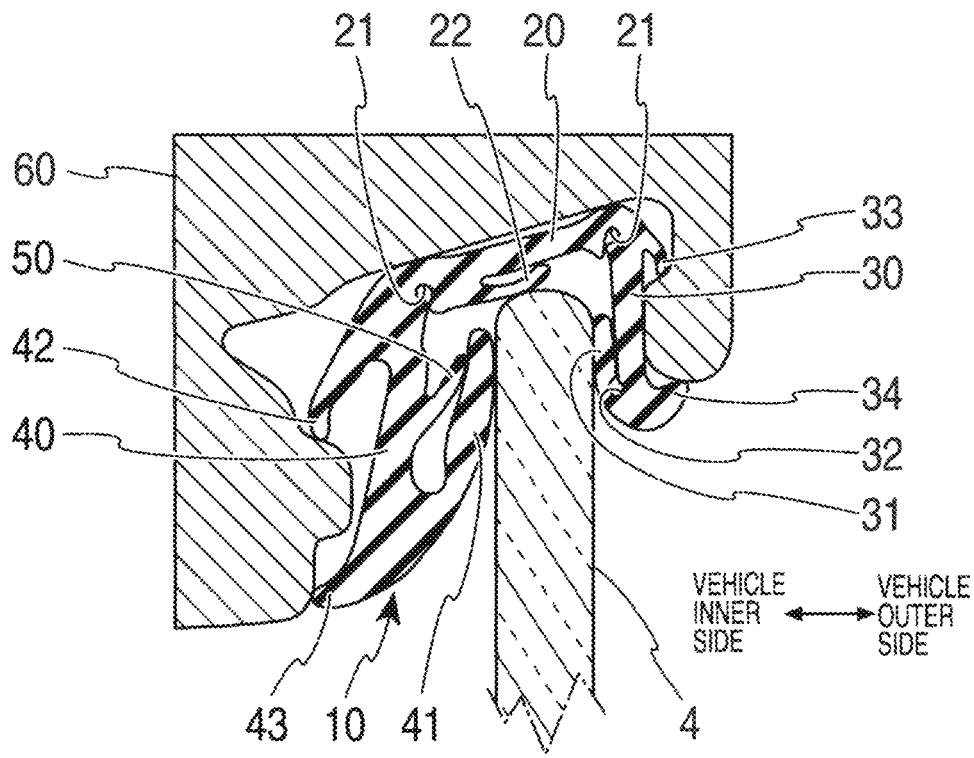
FIG. 4 is a sectional view of a glass run according to a comparative example, taken along line X-X in FIG. 2.

FIG. 4 is a glass run 10 according to a comparative example. The glass run 10 has the same shape as the glass run 10 in FIG. 3, and does not include the hard portion 35. In descriptions below, the same portions as in the foregoing embodiment are denoted with the same reference signs.

Figure 5:
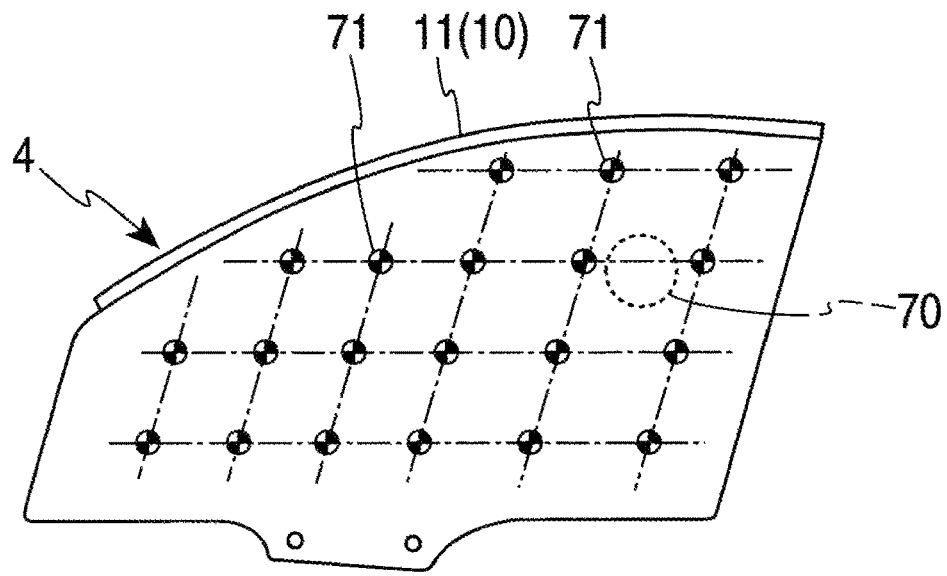
FIG. 5 illustrates measurement of a noise.

FIG. 5 illustrates measurement of the noise. A sound source 70 was placed at a position of a human ear (illustrated with a circle in a broken line in FIG. 5) in the passenger compartment of the vehicle. An acceleration pick-up 71 (vibration level meter) was attached to a vehicle outer side of the door glass 4 at twenty different points to receive the vibration of the door glass 4. The acceleration pick-up 71 is a sensor of the vibration level meter, and outputs an electric signal proportional to the vibration acceleration. As illustrated in FIG. 5, the glass run 10, having the first extruded portion 11 of FIG. 2 and having the cross section illustrated in FIGS. 3 and 4, is attached to a position of the lateral frame of the door glass 4 at the upper part of the vehicle. Then, noise was measured, and the results were compared.

Frequency characteristics felt by the human ears are isomorphic and thus, an octave analysis is applied. In a frequency range of audible frequency to the noise, a sound pressure level for each frequency band is measured through a band pass filter specified in ⅓ octave band analysis. See JIS C 1513: 2002 for the band pass filter characteristics or the like.

As a result of the measurement of the noise, with the glass run 10 of the present embodiment (FIG. 3), the noise was effectively reduced by 0.5 dB on arithmetic average in a range of 2.5 kHz to 5 kHz, as compared with the result of the measurement with the glass run 10 of the comparative example (FIG. 4).

The effective result described above was presumably brought by the glass run 10, in which the hard portion 35 higher in hardness than the vehicle outer side wall 30 is formed on the vehicle outer side wall 30, and the hard portion 35 abuts the vehicle outer seal lip 31. This configuration leads to the increased rigidity of the glass run 10 and thus a smaller difference in rigidity between the glass run 10 and the door glass 4. Then, the impedance matching allows the vibration energy of the door glass 4 to efficiently flow (transmit) to the hard portion 35 of the vehicle outer side wall 30, in other words, to the glass run 10 to dissipate. As a result, the noise caused by wind noise is reduced.

In addition, the hard portion 35 is formed including the neutral axis of the vehicle outer side wall 30. With this configuration, when the glass run 10 is deformed to align with the shape of the door frame 3, the hard portion 35 hardly hinders the glass run 10 from being deformed, and rather facilitates the glass run 10 to be deformed to align with the curved shape of the door frame 3.

Accordingly, no shape modification is required of the basic framework of the glass run 10, and no adverse effect is to be made on other performances of the glass run 10 (e.g., attachability to the door frame 3, sealing with the door glass 4 for prevention of any inclusion of foreign substances such as raindrops or dust, or others).

Figure 6:
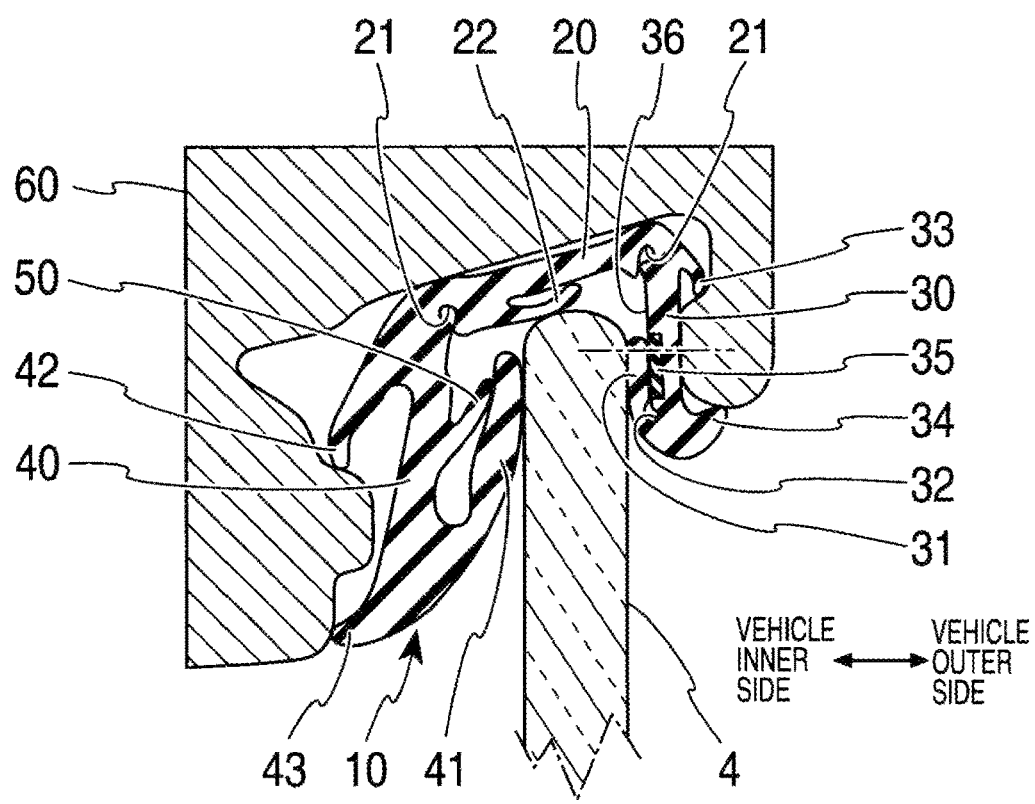
FIG. 6 is a sectional view of a glass run according to a second embodiment of the present invention, taken along line X-X in FIG. 2.
Figure 7:
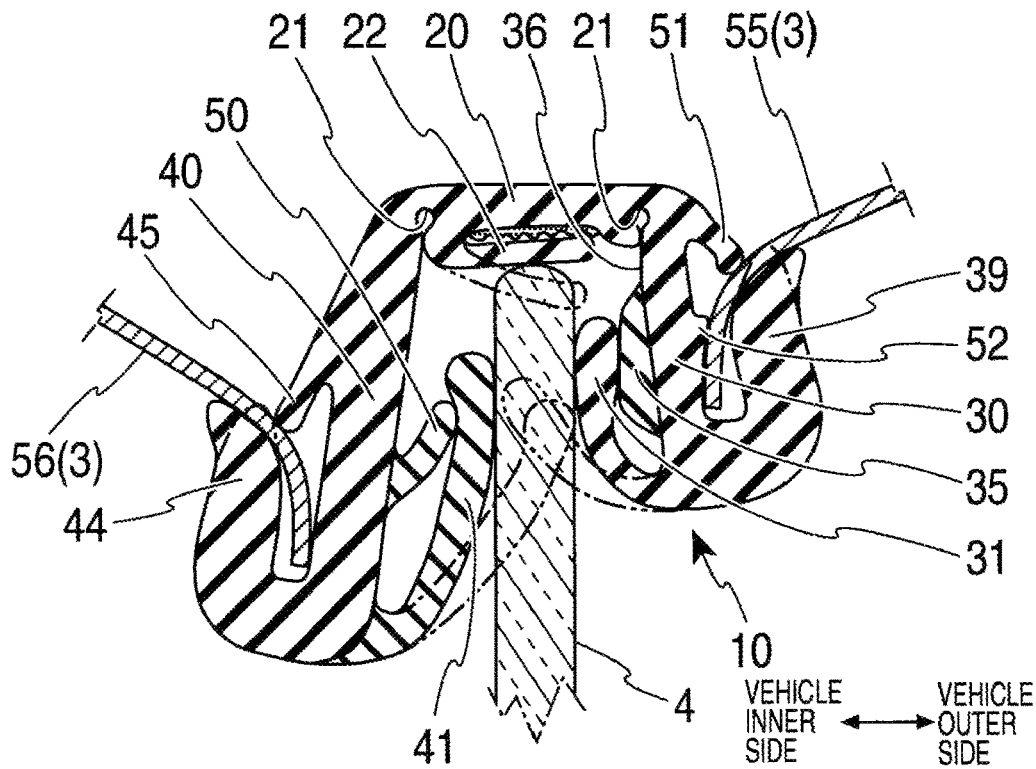
FIG. 7 is a sectional view of a glass run according to a third embodiment of the present invention, taken along line X-X in FIG. 2.
Figure 8:
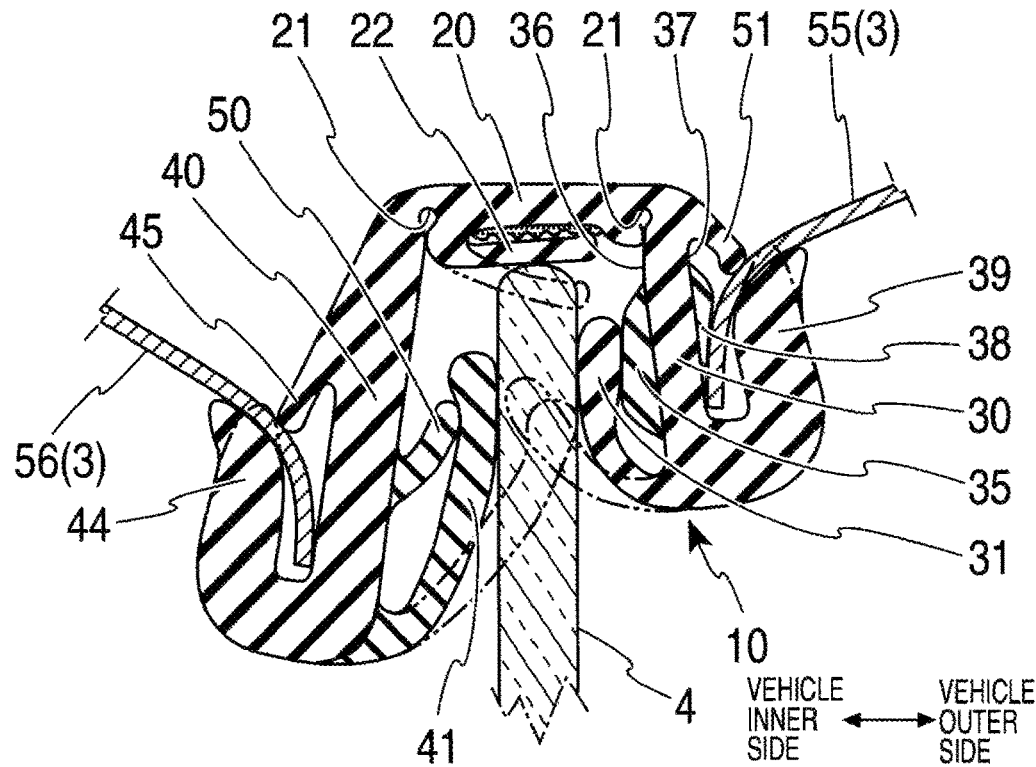
FIG. 8 is a sectional view of a glass run according to a fourth embodiment of the present invention, taken along line X-X in FIG. 2.
Figure 9:
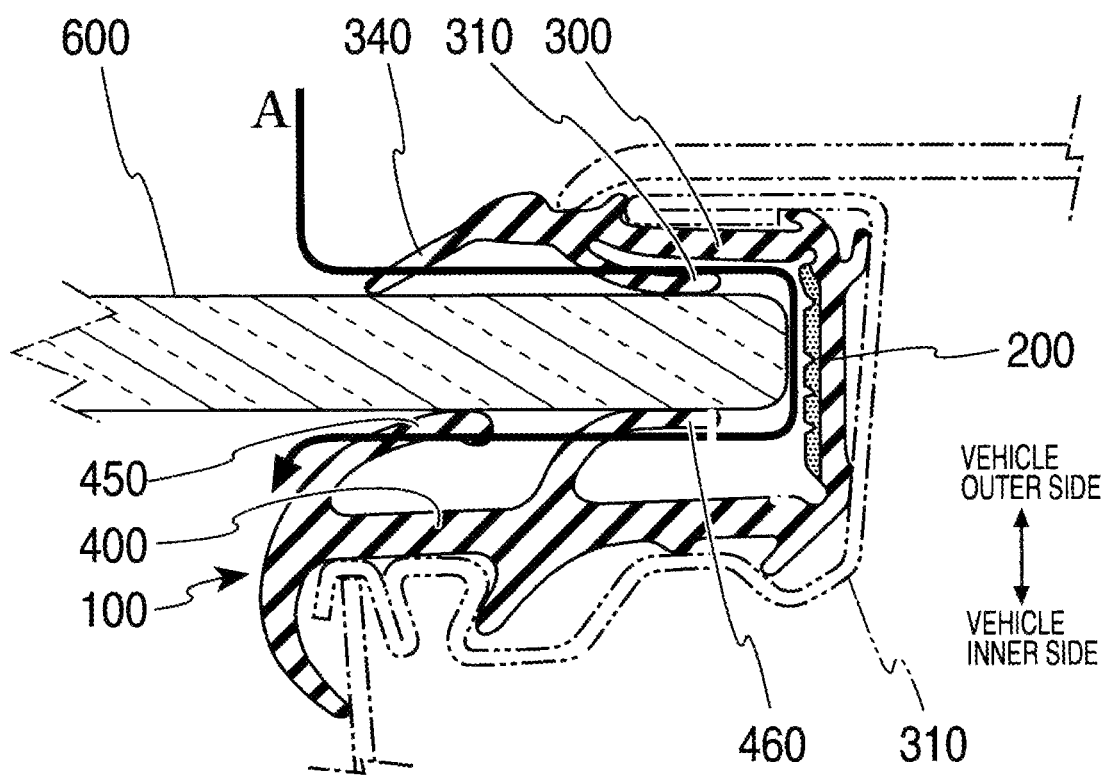
FIG. 9 is a sectional view of a structure of a conventional glass run to be attached to a door frame (Japanese Patent Application Laid-Open No. 2021-24388).

FIGS. 6 to 8 are diagrams, respectively corresponding to second to fourth embodiments of the present invention, and represent variations of the area where the hard portion 35 is formed in FIG. 3.

FIG. 6 is a diagram of a glass run according to the second embodiment, and illustrates a modification of the first embodiment. In the second embodiment, the hard portion 35 is formed inward from the vehicle inner surface 36 of the vehicle outer side wall 30 to be exposed toward the vehicle inner side of the vehicle outer side wall 30 (toward the door glass 4). The door frame applied to the second embodiment is the same as in the first embodiment. Here, a neutral axis in the vehicle outer side wall 30 is illustrated with a broken line.

In FIG. 6, the hard portion 35 has a smaller thickness than in FIG. 3, and is thus formed to extend in a direction of top to bottom of the vehicle outer side wall 30. With this configuration, when being deformed to align with the shape of the door frame 3, the glass run 10 is somewhat less easily deformed than in FIG. 3 (the first embodiment).

In FIG. 6, a hard-portion-forming portion corresponds to the area where the hard portion 35 is located in the vehicle outer side wall 30 from the vehicle inner side toward the vehicle outer side. A vehicle outer side of the vehicle outer seal lip 31 substantially entirely abuts the hard portion 35 except for the vehicle outer seal lip recess 32. With this configuration, the glass run 10 including the vehicle outer side wall 30 has the increased rigidity. Then, the vibration energy of the door glass is to efficiently flow and dissipate, thereby reducing the noise caused by wind noise.

In addition, the hard-portion-forming portion abuts the jig 60 (the door frame 3 when being attached to the vehicle) to be sandwiched between the door frame 3 and door glass 4, leading to further increased rigidity of the glass run 10 including the vehicle outer side wall 30. As a result, the vibration energy transmitted to the hard-portion-forming portion, in which the hard portion 35 is formed, in the vehicle outer side wall 30 is efficiently reduced, and the noise caused by wind noise is further reduced.

FIG. 7 is a diagram of a glass run 10 according to the third embodiment, and the glass run 10 is applied to a structure of the door including a door frame that is different from those of the first and second embodiments. The door frame 3 includes an outer frame 55 and an inner frame 56. With the glass run 10 according to the third embodiment, when being attached to the door frame 3, the vehicle outer seal lip 31 and the vehicle outer side wall 30 have a greater space therebetween than in the first and second embodiments using a sash door. With the glass run 10 in FIG. 7, portions having the same functions as those in the glass run 10 in FIG. 3, while different in shape, are denoted with the same names and reference signs. In addition, with regard to items described above, a description thereof will be omitted as appropriate.

At the vehicle outer side of the tip of the vehicle outer side wall 30, a vehicle outer cover lip 39 is formed in an opposite direction to the vehicle outer seal lip 31. At a vehicle outer side of a tip of the bottom wall 20, a vehicle outer lip 51 is formed toward the vehicle outer cover lip 39. At the vehicle outer side of the vehicle outer side wall 30 between the vehicle outer lip 51 and the vehicle outer cover lip 39, a projection 52 is formed near the vehicle outer lip 51.

At a vehicle inner side of the tip of the vehicle inner side wall 40, a vehicle inner cover lip 44 is formed in an opposite direction of the vehicle inner seal lip 41. At the vehicle inner side of the tip of the bottom wall 20, a vehicle inner lip 45 is formed toward the vehicle inner cover lip 44.

The outer frame 55 is inserted between the vehicle outer side wall 30 and the vehicle outer cover lip 39 of the glass run 10, and the glass run 10 is held to the outer frame 55 at the vehicle outer side by the vehicle outer side wall 30, the projection 52, the vehicle outer cover lip 39, and the vehicle outer lip 51.

Meanwhile, the inner frame 56 is inserted between the vehicle inner side wall 40 and the vehicle inner cover lip 44, and the glass run 10 is held to the inner frame 56 at the vehicle inner side by the vehicle inner side wall 40, the vehicle inner cover lip 44, and the vehicle inner lip 45.

In the third embodiment, the hard portion 35 is formed protruding in a substantially trapezoidal shape from the vehicle inner surface 36 of the vehicle outer side wall 30 toward the vehicle inner side. As has been described above, with the greater space between the vehicle outer seal lip 31 and the vehicle outer side wall 30, the hard portion 35 is formed protruding toward the vehicle inner side from the vehicle inner surface 36 of the vehicle outer side wall 30, thereby allowing the vehicle outer surface of the vehicle outer seal lip 31 to abut a surface of an upper edge of the hard portion 35 in the trapezoidal shape.

With this configuration, the vehicle outer side wall 30, on which the hard portion 35 is formed, is sandwiched between the outer frame 55 (door frame 3) and the door glass 4, leading to the increased rigidity of the glass run 10 including the vehicle outer side wall 30. Then, the vibration energy of the door glass 4 is to efficiently flow and dissipate, thereby reducing the noise caused by wind noise.

FIG. 8 is a diagram of a glass run according to the fourth embodiment, and illustrates a modification of the third embodiment. In the glass run according to the fourth embodiment, in addition to the structure of the third embodiment, the vehicle outer hard portion 38 is formed protruding toward the vehicle outer side from the vehicle outer surface 37 of the vehicle outer side wall 30. The vehicle outer hard portion 38 has the same material and hardness as those of the hard portion 35. With the vehicle outer hard portion 38 being additionally included, the rigidity of the glass run 10 including the vehicle outer side wall 30 is further increased, as compared with in the third embodiment. Accordingly, the vibration energy of the door glass 4 is to more efficiently flow and dissipate, thereby further reducing the noise caused by wind noise.

In the fourth embodiment, the vehicle outer hard portion 38 is formed protruding toward the vehicle outer side from the vehicle outer surface 37 of the vehicle outer side wall 30. Alternatively, in accordance with the state in which the vehicle outer side wall 30 abuts a vehicle inner surface of the outer frame 55, the vehicle outer hard portion 38 may be formed protruding inward from the vehicle outer surface 37 of the vehicle outer side wall 30.

In the embodiments of the present invention, the glass run 10 may be formed of rubber, thermoplastic elastomer, soft synthetic resin, or others. As the rubber, ethylene propylene diene rubber (EPDM) is preferable, and as the thermoplastic elastomer, olefinic thermoplastic elastomer (TPO) or dynamic cross-linking thermoplastic elastomer (TPV) is preferable from viewpoints of weather resistance, recycling, cost, or others.

The present invention is not limited to the foregoing embodiments, and various modifications may be made within a range not deviating from the object of the present invention.

For example, in the first to fourth embodiments, the present invention is applied to the first extruded portion 11 corresponding to the lateral frame of the door frame 3 in FIG. 2, but may be applied to the second extruded portion 12 corresponding to the vertical frame at the front side of the front door 1, the third extruded portion 13 corresponding to the vertical frame at the rear side of the front door 1, the first molded portion 14, or the second molded portion 15. In this case, the first to third extruded portions 11 to 13 and the first and second molded portions 14 and 15 of the glass run 10 are not to be deformed, and the hard portion 35 may thus not necessarily be formed including the neutral axis of the vehicle outer side wall 30.

For example, the fourth embodiment may also be applied to the second embodiment. In other words, the hard portion 35 is formed at the vehicle inner side of the vehicle outer side wall 30, and the vehicle outer hard portion 38 is formed at the vehicle outer side of the vehicle outer side wall 30. Here, the hard portion 35 is formed inward from the vehicle inner surface 36 of the vehicle outer side wall 30, and the vehicle outer hard portion 38 is formed inward from the vehicle outer surface 37 of the vehicle outer side wall 30.

For example, the hard portion 35 according to the first embodiment may be applied to the structure of the door including the door frame according to each of the third and fourth embodiments. In this case, the hard portion 35 may be formed entirely through the vehicle outer side wall 30, or may be formed partially through the vehicle outer side wall 30.

What is claimed is:

1. A glass run attached to a door frame of a door of a vehicle, the glass run comprising:
   a bottom wall;
   a vehicle inner side wall extending from the bottom wall;
   a vehicle outer side wall extending from the bottom wall;
   a vehicle inner seal lip connected to the vehicle inner side wall; and
   a vehicle outer seal lip connected to the vehicle outer side wall,
   the glass run configured to guide an up and down movement of a door glass, wherein
   a hard portion is formed on the vehicle outer side wall, the hard portion having a higher hardness than a material that forms the vehicle outer side wall,
   the hard portion abuts the vehicle outer seal lip,
   the vehicle outer side wall includes a hard-portion-forming portion where the hard portion is formed,
   the hard portion is formed only within an area bounded in a vehicle inner side-vehicle outer side direction by a vehicle inner side of the vehicle outer side wall and the vehicle outer seal lip, and
   the hard-portion-forming portion abuts the door frame.

2. The glass run according to claim 1, wherein
   the hard portion is formed inward from a vehicle inner surface of the vehicle outer side wall.

3. The glass run according to claim 1, wherein the hard portion is formed protruding toward the vehicle inner side from a vehicle inner surface of the vehicle outer side wall.

4. The glass run according to claim 1, wherein a vehicle outer hard portion is formed on a vehicle outer surface of the vehicle outer side wall, and the vehicle outer hard portion abuts the door frame.

5. The glass run according to claim 1, wherein the hard portion is formed including a neutral axis of the vehicle outer side wall.

6. A glass run attached to a door frame of a door of a vehicle, the glass run comprising:
a bottom wall;
a vehicle inner side wall extending from the bottom wall;
a vehicle outer side wall extending from the bottom wall;
a vehicle inner seal lip connected to the vehicle inner side wall; and
a vehicle outer seal lip connected to the vehicle outer side wall,
the glass run configured to guide an up and down movement of a door glass, wherein
a hard portion is formed on the vehicle outer side wall, the hard portion having a higher hardness than a material that forms the vehicle outer side wall,
the hard portion is formed only through the vehicle outer side wall from a vehicle inner side toward a vehicle outer side, and
the hard portion abuts the door frame.

7. The glass run according to claim 6, wherein the hard portion is formed including a neutral axis of the vehicle outer side wall.

* * * * *